Feb. 19, 1929.
A. S. RAMAGE
1,702,313
PROCESS FOR REFINING MINERAL OILS
Filed Nov. 3, 1924
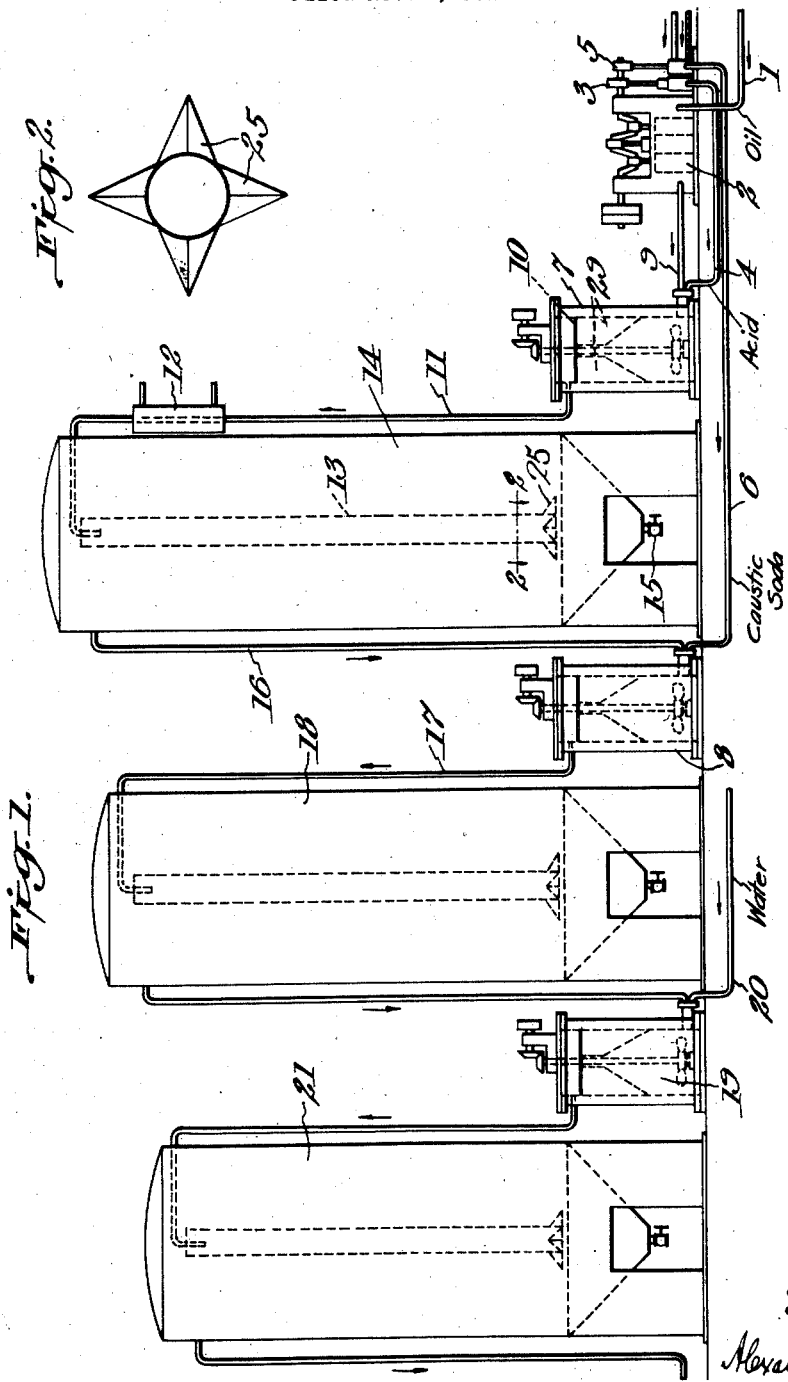

Patented Feb. 19, 1929.

1,702,313

UNITED STATES PATENT OFFICE.

ALEXANDER S. RAMAGE, OF DETROIT, MICHIGAN, ASSIGNOR, BY MESNE ASSIGNMENTS, TO GYRO PROCESS COMPANY, A CORPORATION OF MICHIGAN.

PROCESS FOR REFINING MINERAL OILS.

Application filed November 3, 1924. Serial No. 747,641.

My invention relates to a process for the continuous refining of mineral oils, as well as their distillates such as gasoline, kerosene, and lubricating oils. My invention is an improvement on the common practice of subjecting the oils or distillates to the successive action of sulfuric acid and caustic soda, and comprises subjecting the oil to be refined to an intimate mixing with the acid, then while the mixture is still in continuous flow, allowing the sludge to settle out; then intimately mixing the resulting treated oil with caustic soda, and again allowing the sludge to settle out, and then subjecting the neutralized mixture to intimate mixing with water followed by a final settling.

My method thus provides for refining oil in continuous flow, the rate of flow through the large tanks being sufficiently slow to permit settling out of sludge or water, the successive liquors overflowing at the upper portions of the tanks.

The process and apparatus will be readily understood from the accompanying description and drawings in which Fig. 1 is a diagrammatic view of the purifying plant; and Fig. 2 is a detail.

The crude oil or distillate is delivered through pipe 1 to the pump 2, here shown as a triplex pressure pump composed of three cylinders. A second pump 3, preferably of phosphor bronze and mounted on an adjustable eccentric, delivers sulfuric acid through pipe 4; and an iron pump 5, also mounted on an adjustable eccentric, delivers caustic soda through pipe 6. These pumps are preferably driven from the same power source and are adjusted so that the exact quantities of oil and reagent are delivered into the mixing cylinders 7 and 8.

The mixing cylinder 7 receives oil and acid from pipes 4 and 9, near its bottom, and the entering stream encounters a rapidly revolving screw propeller, by which it is broken up and delivered upwardly against radially arranged vanes 29, four being usually employed. The stream is further broken up and its components brought into further intimate contact by passage through a perforated diaphragm 10 extending across the mixing cylinder below the exit orifice at the top. The intimately mixed liquids pass up through the lead pipe 11, and a cooler 12, if desired, into a pipe 13, extending downwardly towards the lower portion of a lead lined settling tank 14. This pipe 13 is preferably provided with outwardly extending tectiform arms 25, to distribute the liquid rising from the bottom of the tube. The ridge of these arms slopes down from the horizontal so that the sides of the arms meet at their outer end in a point, the lower edges of the said arms describing a V-shaped horizontal plane. This construction of the arms causes the liquid to be distributed by a rolling motion from under the arms. The tank 14 preferably has a cone-shaped bottom provided with a valved exit pipe 15, through which the sludge can be drawn continuously or intermittently. The accumulated sludge may rise above the bottom of pipe 13, so that as the mixed liquids slowly rise they are filtered through the sludge, and the clear liquor flows off at the top, and is delivered through pipe 16 to mixer 8. This mixer is like mixer 7 and the requisite amount of caustic soda delivered from pump 5 through pipe 6 is injected into the clear liquor from pipe 16 and into the agitator 8, from which the mixed liquor passes down into settling tank 18 of the same construction as tank 14, except that it is not lead lined.

From this settler the clear neutralized oil flows into another agitator, 19, into which is injected through pipe 20, the requisite amount of water for thorough washing. From the agitator 19 the liquor is delivered into a third settling tank 21, from which it overflows through pipe 22 as clear washed oil to a refining still or other place of utilization.

As a specific example of the operation in the refining of a motor fuel, the pumps are adjusted so that there are delivered to the first agitator 42 gallons of oil per minute at a pressure of 20 lbs. per sq. in. The acid pump delivers per minute 1½ pints of 70% sulfuric acid, and the soda pump 1 pint per minute of 20° Bé. caustic soda solution. The oil and reagents are each delivered at a constant pressure of about 20 lbs. per sq. in. The first agitator and oil pipes and other parts connected thereto are made of or lined with acid resistant material such as lead.

The settling tanks, 14, 18 and 21, are, in practice, about 24, 21 and 18 feet high respectively, and are arranged so that there is a difference in hydraulic head of about 3 feet.

The mixing devices are cylinders about 2 feet high by 10 inches in diameter, and the phosphor bronze screw-propeller is driven at a speed of about 300 revolutions per minute. A simple unit of this kind continuously treates from 1200-1400 barrels per day, and owing to the very intimate contact between the reagents and the oil undergoing treatment, not only can more dilute acid be used but there is a saving of from 60%-80% in the amount of chemicals used.

The sludge from the settlers may, if desired, be drawn off continuously by setting the valves at the bottoms of the cones partially open. Owing to the fact that more dilute chemicals can be used, the sludge from the acid settler is very thin and can be very easily treated for the recovery of by-products and acid.

The process and apparatus while they have been specifically described for use in refining distillate, such as motor spirit, are applicable for the treatment of crude oil, coal-tar products and the like.

I claim:

1. The process of refining oil which consists in bringing into intimate admixture by mechanical agitation, measured quantities of oil and acid, delivering the mixture so produced into the lower portion of a slowly moving body thereof from which the sludge is allowed to settle out, overflowing the clear acid oil into contact with a caustic soda solution and producing an intimate mixture thereof by mechanical agitation, delivering the mixture so produced into the lower portion of a slowly moving body thereof, and then overflowing the neutralized oil and washing it.

2. A process as claimed in claim 1 in which the washing is effected by bringing the neutralized oil into intimate admixture with water by mechanical agitation, delivering the mixture so produced into the lower portion of a slowly moving body thereof and overflowing the refined oil.

In testimony whereof, I affix my signature.

ALEXANDER S. RAMAGE.